United States Patent
Cho et al.

(10) Patent No.: US 9,560,686 B2
(45) Date of Patent: Jan. 31, 2017

(54) METHOD AND APPARATUS FOR RECONFIGURING DEVICE-TO-DEVICE CONNECTION INFORMATION IN WIRELESS COMMUNICATION SYSTEM

(71) Applicant: LG ELECTRONICS INC., Seoul (KR)

(72) Inventors: Heejeong Cho, Anyang-si (KR); Jaehoon Chung, Anyang-si (KR); Eunjong Lee, Anyang-si (KR); Hyeyoung Choi, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 23 days.

(21) Appl. No.: 14/395,772

(22) PCT Filed: Feb. 15, 2013

(86) PCT No.: PCT/KR2013/001191
§ 371 (c)(1),
(2) Date: Oct. 20, 2014

(87) PCT Pub. No.: WO2013/162166
PCT Pub. Date: Oct. 31, 2013

(65) Prior Publication Data
US 2015/0117292 A1   Apr. 30, 2015

Related U.S. Application Data

(60) Provisional application No. 61/639,093, filed on Apr. 27, 2012.

(51) Int. Cl.
*H04W 76/02*    (2009.01)
*H04W 28/24*    (2009.01)
(Continued)

(52) U.S. Cl.
CPC ............ *H04W 76/023* (2013.01); *H04L 67/10* (2013.01); *H04W 28/24* (2013.01);
(Continued)

(58) Field of Classification Search
None
See application file for complete search history.

(56) References Cited

U.S. PATENT DOCUMENTS

| 2011/0106952 | A1* | 5/2011 | Doppler | H04W 72/0406 709/226 |
| 2012/0207100 | A1* | 8/2012 | Hakola | H04W 76/023 370/329 |

(Continued)

FOREIGN PATENT DOCUMENTS

| JP | 2007-096862 | 4/2007 |
| KR | 10-2011-0089311 | 8/2011 |

(Continued)

OTHER PUBLICATIONS

PCT International Application No. PCT/KR2013/001191, Written Opinion of the International Searching Authority dated May 31, 2013, 1 page.

*Primary Examiner* — Mohammad Adhami
(74) *Attorney, Agent, or Firm* — Lee Hong Degerman Kang & Waimey

(57) ABSTRACT

A method and apparatus for reconfiguring device-to-device (D2D) connection information in a wireless communication system is provided. A first device is connected to a second device through a D2D connection. The first device receives a connection reconfiguration request message including at least one of a new quality of service (QoS) parameter, a new security information parameter, and a new D2D identifier, transmits a connection reconfiguration response message, which indicates whether to accept the request of the connection reconfiguration, to the response of the connection reconfiguration request message, and receives a connection reconfiguration confirm message.

6 Claims, 6 Drawing Sheets

(51) Int. Cl.
  *H04W 52/02* (2009.01)
  *H04L 29/08* (2006.01)
  *H04W 76/00* (2009.01)
  *H04W 92/18* (2009.01)
(52) U.S. Cl.
  CPC ..... *H04W 52/0219* (2013.01); *H04W 76/002* (2013.01); *H04W 76/021* (2013.01); *H04W 76/028* (2013.01); *H04W 92/18* (2013.01)

(56) References Cited

U.S. PATENT DOCUMENTS

| | | | | |
|---|---|---|---|---|
| 2013/0064138 A1* | 3/2013 | Hakola | ................. | H04W 8/005 370/255 |
| 2013/0122918 A1* | 5/2013 | Boley | ................. | H04W 76/046 455/450 |
| 2013/0260811 A1* | 10/2013 | Rayavarapu | ........ | H04W 76/028 455/509 |
| 2014/0003320 A1* | 1/2014 | Etemad | ................... | H04W 4/06 370/312 |
| 2015/0056983 A1* | 2/2015 | Cho | .................... | H04W 76/021 455/426.1 |
| 2015/0085747 A1* | 3/2015 | Cho | .................... | H04W 76/023 370/328 |
| 2015/0117293 A1* | 4/2015 | Cho | .................... | H04W 76/002 370/312 |

FOREIGN PATENT DOCUMENTS

| | | |
|---|---|---|
| KR | 10-2011-0103852 | 9/2011 |
| KR | 10-1128800 | 3/2012 |
| WO | 2010/028690 | 3/2010 |

\* cited by examiner

METHOD AND APPARATUS FOR RECONFIGURING DEVICE-TO-DEVICE CONNECTION INFORMATION IN WIRELESS COMMUNICATION SYSTEM

CROSS-REFERENCE TO RELATED APPLICATIONS

This application is the National Stage filing under 35 U.S.C. 371 of International Application No. PCT/KR2013/001191, filed on Feb. 15, 2013, which claims the benefit of U.S. Provisional Application Ser. No. 61/639,093, filed on Apr. 27, 2012, the contents of which are hereby incorporated by reference herein in their entirety.

BACKGROUND OF THE INVENTION

Field of the Invention

The present invention relates to wireless communications, and more particularly, to a method and apparatus for reconfiguring device-to-device (D2D) connection information in a wireless communication system.

Related Art

In next generation multimedia mobile communication systems, which have been actively studied in recent years, there is a demand for a system capable of processing and transmitting a variety of information (e.g., video and radio data) in addition to the early-stage voice service. Further, a 3rd generation wireless communication system is followed by a 4th generation wireless communication which is currently being developed aiming at supporting a high-speed data service of 1 gigabits per second (Gbps) in downlink and 500 megabits per second (Mbps) in uplink. The wireless communication system is designed for the purpose of providing reliable communication to a plurality of users irrespective of their locations and mobility. However, a wireless channel has an abnormal characteristic such as a fading phenomenon caused by a path loss, noise, and multipath, an inter-symbol interference (ISI), a Doppler effect caused by mobility of a user equipment, etc. Therefore, various techniques have been developed to overcome the abnormal characteristic of the wireless channel and to increase reliability of wireless communication.

Meanwhile, with the advent of a ubiquitous environment, there is a rapid increase in a demand for receiving a seamless service anytime anywhere by using equipments. In order to satisfy such a demand, a device-to-device (D2D) connection technique may be introduced in a wireless communication system. The D2D connection technique refers to a technique for transmitting and receiving data not via a base station (BS) since devices such as a user equipment (UE) or the like are connected to each other. That is, one device can communicate with another device via the BS, and can directly communicate with another device not via the BS. By using the D2D connection technique, such an effect as low power consumption, throughput enhancement, etc., can be obtained.

Various scenarios may exist to establish the D2D connection. There may be a D2D connection scenario on the basis of whether the D2D connection establishment is initiated by the BS or each device. In addition, there may be a D2D connection scenario on the basis of whether information regarding another device neighboring to a specific device is known to the BS or is known to the specific device.

Meanwhile, it may be necessary to configure and/or reconfigure information on a pre-established D2D connection. By configuring and/or reconfiguring the information on the pre-established D2D connection, an effective D2D connection can be guaranteed even if a new D2D connection is not established by disconnecting the existing D2D connection.

Accordingly, there may be a need for a method of effectively configuring and/or reconfiguring information on a pre-established valid D2D connection.

SUMMARY OF THE INVENTION

The present invention provides a method and apparatus for reconfiguring device to device (D2D) connection information in a wireless communication system. The present invention provides a method of reconfiguring D2D connection information either under the control of a network or independently between devices, when a D2D connection is established between the devices in a wireless communication system.

In an aspect, a method for reconfiguring, by a first device, device-to-device (D2D) connection information in a wireless communication system, the first device being connected to a second device through a D2D connection, is provided. The method includes receiving a connection reconfiguration request message including at least one of a new quality of service (QoS) parameter, a new security information parameter, and a new D2D identifier, transmitting a connection reconfiguration response message, which indicates whether to accept the request of the connection reconfiguration, to the response of the connection reconfiguration request message, and receiving a connection reconfiguration confirm message.

In another aspect, a first device which is connected to a second device through a D2D connection is provided. The first device includes a radio frequency (RF) unit for transmitting or receiving a radio signal, and a processor, operatively coupled to the RF unit, and configured for receiving a connection reconfiguration request message including at least one of a new quality of service (QoS) parameter, a new security information parameter, and a new D2D identifier, transmitting a connection reconfiguration response message, which indicates whether to accept the request of the connection reconfiguration, to the response of the connection reconfiguration request message, and receiving a connection reconfiguration confirm message.

In another aspect, a method for reconfiguring, by a first device, device-to-device (D2D) connection information in a wireless communication system, the first device being connected to a second device through a D2D connection, is provided. The method includes receiving a connection reconfiguration request message including at least one of a new quality of service (QoS) parameter, a new security information parameter, and a new D2D identifier, from a network, transmitting a D2D uplink resource request to the network, receiving a D2D uplink grant from the network, and transmitting a connection reconfiguration response message, which indicates whether to accept the request of the connection reconfiguration, to the response of the connection reconfiguration request message.

D2D connection information is efficiently reconfigured.

DESCRIPTION OF EXEMPLARY EMBODIMENTS

The technology described below can be used in various wireless communication systems such as code division multiple access (CDMA), frequency division multiple access (FDMA), time division multiple access (TDMA), orthogonal frequency division multiple access (OFDMA), single carrier frequency division multiple access (SC-FDMA), etc. The CDMA can be implemented with a radio technology such as universal terrestrial radio access (UTRA) or CDMA-2000. The TDMA can be implemented with a radio technology such as global system for mobile communications (GSM)/general packet ratio service (GPRS)/enhanced data rate for GSM evolution (EDGE). The OFDMA can be implemented with a radio technology such as institute of electrical and electronics engineers (IEEE) 802.11 (Wi-Fi), IEEE 802.16 (WiMAX), IEEE 802-20, evolved UTRA (E-UTRA), etc. IEEE 802.16m is an evolution of IEEE 802.16e, and provides backward compatibility with an IEEE 802.16-based system. The UTRA is a part of a universal mobile telecommunication system (UMTS). 3rd generation partnership project (3GPP) long term evolution (LTE) is a part of an evolved UMTS (E-UMTS) using the E-UTRA. The 3GPP LTE uses the OFDMA in downlink and uses the SC-FDMA in uplink. LTE-advance (LTE-A) is an evolution of the 3GPP LTE.

Figure 1:
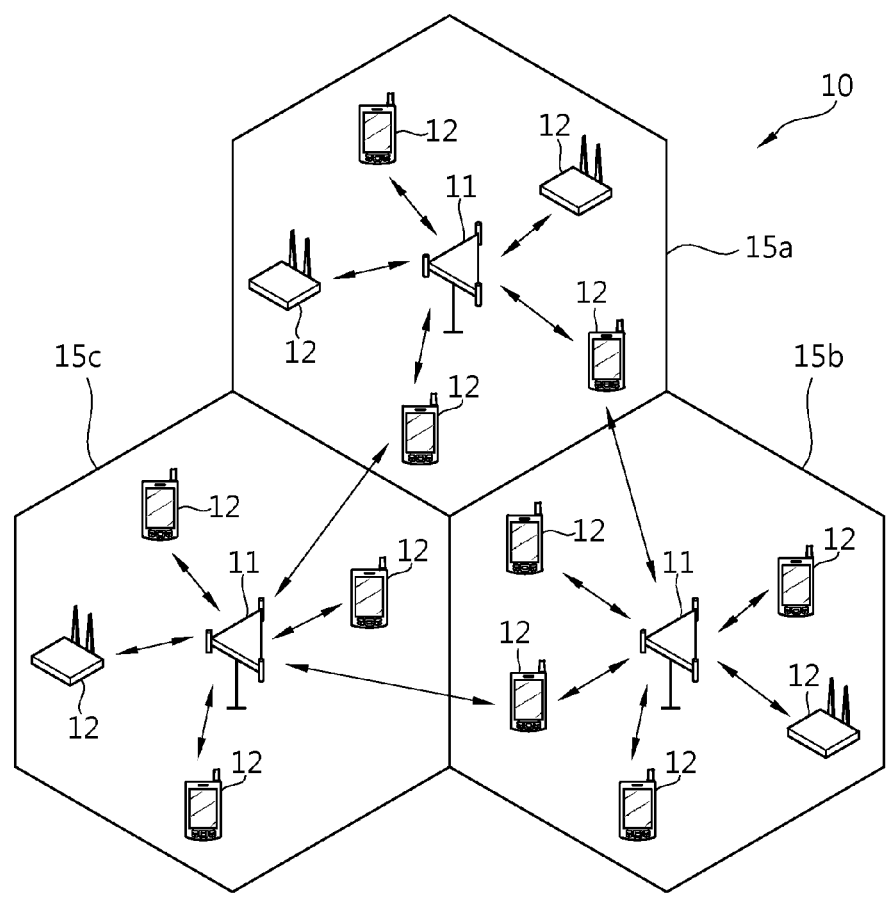
FIG. 1 shows a wireless communication system.

FIG. 1 shows a wireless communication system.

The wireless communication system 10 includes at least one base station (BS) 11. Respective BSs 11 provide a communication service to particular geographical areas 15a, 15b, and 15c (which are generally called cells). Each cell may be divided into a plurality of areas (which are called sectors). A user equipment (UE) 12 may be fixed or mobile and may be referred to by other names such as MS (mobile station), MT (mobile terminal), UT (user terminal), SS (subscriber station), wireless device, PDA (personal digital assistant), wireless modem, handheld device. The BS 11 generally refers to a fixed station that communicates with the UE 12 and may be called by other names such as eNB (evolved-NodeB), BTS (base transceiver system), access point (AP), etc.

In general, a UE belongs to one cell, and the cell to which a UE belongs is called a serving cell. A BS providing a communication service to the serving cell is called a serving BS. The wireless communication system is a cellular system, so a different cell adjacent to the serving cell exists. The different cell adjacent to the serving cell is called a neighbor cell. A BS providing a communication service to the neighbor cell is called a neighbor BS. The serving cell and the neighbor cell are relatively determined based on a UE.

This technique can be used for downlink or uplink. In general, downlink refers to communication from the BS 11 to the UE 12, and uplink refers to communication from the UE 12 to the BS 11. In downlink, a transmitter may be part of the BS 11 and a receiver may be part of the UE 12. In uplink, a transmitter may be part of the UE 12 and a receiver may be part of the BS 11.

The wireless communication system may be any one of a multiple-input multiple-output (MIMO) system, a multiple-input single-output (MISO) system, a single-input single-output (SISO) system, and a single-input multiple-output (SIMO) system. The MIMO system uses a plurality of transmission antennas and a plurality of reception antennas. The MISO system uses a plurality of transmission antennas and a single reception antenna. The SISO system uses a single transmission antenna and a single reception antenna. The SIMO system uses a single transmission antenna and a plurality of reception antennas. Hereinafter, a transmission antenna refers to a physical or logical antenna used for transmitting a signal or a stream, and a reception antenna refers to a physical or logical antenna used for receiving a signal or a stream.

A device-to-device (D2D) connection technique may be introduced in a wireless communication system. The D2D connection technique refers to a technique for transmitting and receiving data not via a base station (BS) since devices such as a user equipment (UE) or the like are connected to each other. Various scenarios may exist to establish the D2D connection. The D2D connection establishment may be initiated by a network or by each device.

Hereinafter, a method of establishing a D2D connection will be described.

Figure 2:
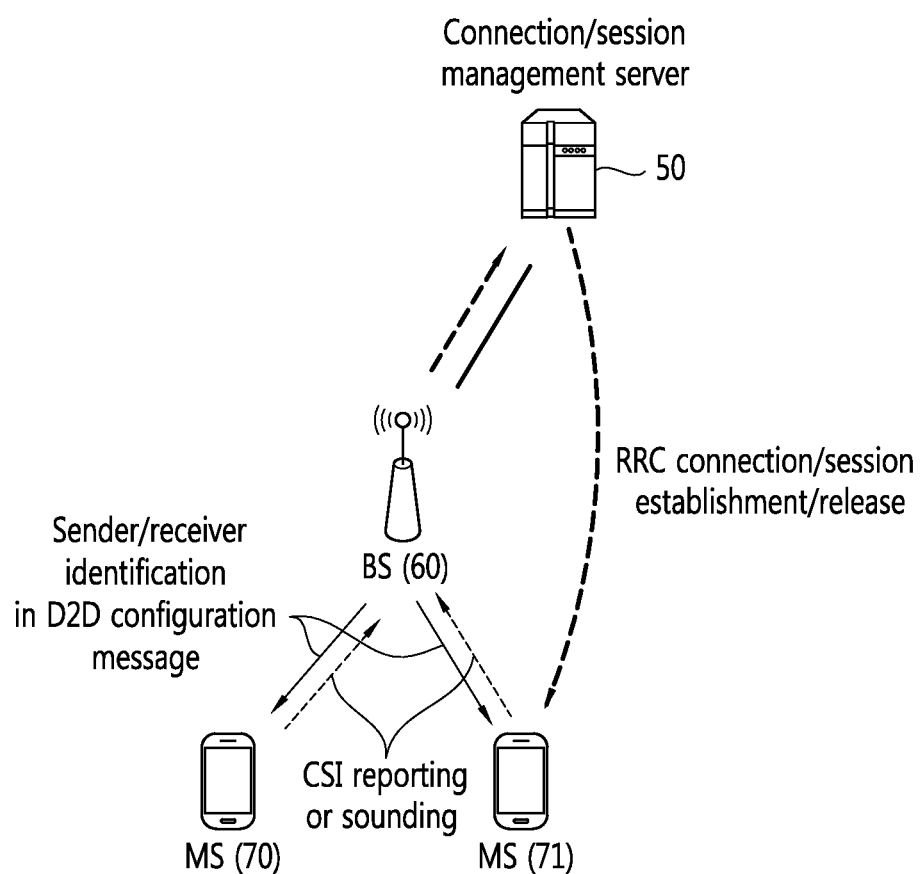
FIG. 2 shows an example of a D2D connection scenario according to an embodiment of the present invention.

FIG. 2 shows an example of a D2D connection scenario according to an embodiment of the present invention.

Specifically, FIG. 2 shows an example of a network-initiated D2D connection establishment. A network is aware of information on other devices neighboring to a specific device, and the specific device cannot know information on other neighbor devices. Therefore, in this scenario, only the network can initiate the D2D connection establishment, and each device cannot initiate the D2D connection establishment. If an uplink (UL) packet transmitted from each device is received, the network can perform a D2D connection establishment procedure according to a destination of the packet, a location of the destination, or the like. The network can determine whether devices are neighboring to each other by using a location of each device, routing information, etc.

Referring to FIG. 2, each of devices 70 and 71 periodically performs channel state information (CSI) reporting or sounding with respect to a BS 60. The BS 60 can request a D2D connection establishment to each of the devices 70 and 71 by determining a proximity between the devices 70 and 71 by the use of location information of the devices 70 and 71, a presence of data to be transmitted between the devices 70 and 71, a preference for a D2D connection of each of the devices 70 and 71, etc. The network and each of the devices 70 and 71 can pre-negotiate about whether a D2D connection is preferred or a base station to device (B2D) connection is preferred according to an application type or a data characteristic.

The BS 60 transmits a D2D configuration message to each of the devices 70 and 71 to establish the D2D connection. The D2D configuration message may be transmitted in a unicast manner to a device to which the D2D connection establishment is targeted, or may be transmitted in a broadcast or multicast manner to devices neighboring to the BS. The D2D configuration message may include an identifier of each of the devices 70 and 71. Further, the D2D configuration message may include a connection establishment type, a quality of service (QoS) parameter for the D2D connection, security information, a D2D identifier, etc.

Each of the devices 70 and 71 may accept or deny the D2D configuration message transmitted by the BS 60 and may report this to the BS 60. If each of the devices 70 and 71 accepts the D2D connection, the BS 60 may finally confirm the D2D connection and then report this to each of the devices 70 and 71.

If the D2D connection is established, the BS 60 reports this to a connection/session management server 50, and the connection/session management server 50 instructs each of the devices 70 and 71 to establish/release a radio resource control (RRC) connection/session.

After the D2D connection establishment is complete, each of the devices 70 and 71 can transmit and receive data directly, not via the BS 60. In this case, a D2D resource used by each of the devices 70 and 71 to directly transmit and receive the data may be independent of or shared with a B2D resource for data transmission and reception between the existing each of the devices 70 and 71 and the BS 60.

The aforementioned D2D connection establishment method can be performed in three steps or in two steps. The 3-step D2D connection establishment method is a procedure in which a BS first requests each device to establish a D2D connection, each device accepts or denies the D2D connection requested by the BS, and the BS finally confirms a success or failure of the D2D connection according to whether the D2D connection request is accepted or denied. The 2-step D2D connection establishment method can be used when a D2D connection is established between a specific device and another device of which a D2D connection is not yet established to the specific device in a state where the specific device has already transmitted data to a plurality of random devices in a neighbor area. The specific device may be a device used in a business (e.g., a shop, a restaurant, etc.). If a device which intends to establish a D2D connection accepts a D2D connection request, the D2D connection can be established without a final confirmation. Therefore, the D2D connection establishment procedure can be performed in two steps.

Hereinafter, a method of configuration and/or reconfiguring D2D connection information will be described according to an embodiment of the present invention.

A device and a network may configure and/or reconfigure information on a pre-established valid D2D connection. The information on the D2D connection may include a QoS parameter, security information, a D2D identifier, etc. The security information may include key update information. The D2D identifier indicates an identifier of a D2D connection through which the network is connected to the devices. When a specific device which maintains the D2D connection moves, the D2D identifier may be reconfigured if another device which uses a D2D identifier identical to a D2D identifier assigned to the specific device exists in an area to which the specific device moves.

The D2D identifier may be a link level D2D identifier. The link level D2D identifier is an identifier assigned to a connection for recognizing each UE, and is an identifier assigned to a physical connection between the devices. Only one logical link may exist between the devices. Therefore, the link level D2D identifier may be unique in a specific area. In IEEE 802.16, the link level D2D identifier may be a station identifier (STID). In 3GPP LTE-A, the link level D2D identifier may be a radio network temporary identifier (RNTI). Alternatively, the D2D identifier may be a connection/flow level D2D identifier. The connection/flow level D2D identifier is an identifier assigned to one or more service flows that can be established between the devices, and is an identifier assigned to a logical connection between the devices. A plurality of connections or flows each of which has a different property may exist between the devices. In IEEE 802.16, the connection/flow level D2D identifier may be a flow ID or connection ID in a media access control (MAC) layer. In 3GPP LTE-A, the connection/flow level D2D identifier may be a logical channel ID (LCID) in an MAC layer or a distributed resource block (DRB) identity in a radio link control (RLC) layer. Meanwhile, the D2D identifier may also be used in resource allocation for data transmission and reception after the D2D connection establishment is complete.

The D2D connection information reconfiguration procedure may be performed at the request of the network or the device, or may be performed either under the control of the network or independently between the devices. In addition, the D2D connection information reconfiguration procedure may be performed in three steps or in two steps similarly to the D2D connection configuration procedure.

Figure 3:
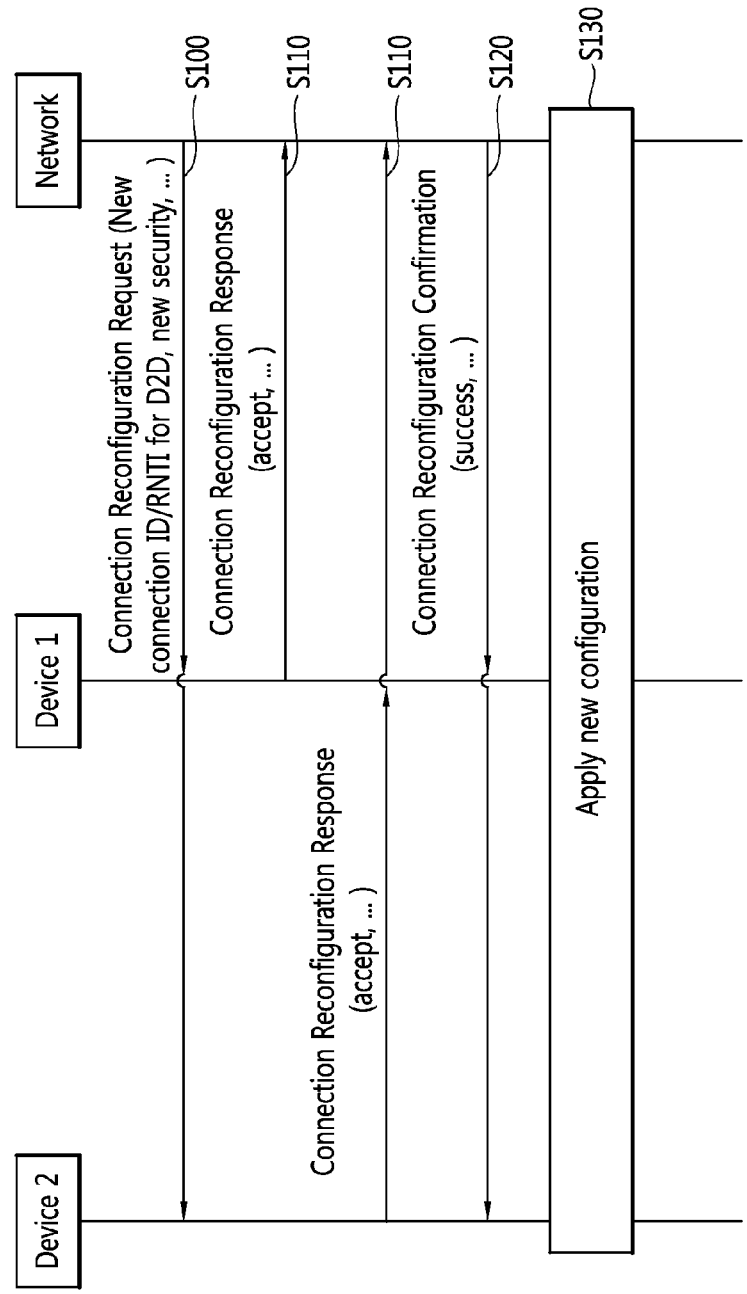
FIG. 3 shows an example of a D2D connection information reconfiguration method according to an embodiment of the present invention.

FIG. 3 shows an example of a D2D connection information reconfiguration method according to an embodiment of the present invention. In case of FIG. 3, a 3-step D2D connection information reconfiguration procedure is performed at the request of a network.

Referring to FIG. 3, in step S100, the network transmits a connection reconfiguration request message to devices 1 and 2 to which a D2D connection is established. The connection reconfiguration request message may include at least one of a new D2D identifier, new security information, and a new QoS parameter. The connection reconfiguration request message may be transmitted in a unicast manner to each of the devices 1 and 2, or may be transmitted in a multicast manner by using a D2D identifier assigned in the D2D connection establishment procedure.

In step S110, the devices 1 and 2 transmit a connection reconfiguration response message through the network. The connection reconfiguration response message indicates whether to accept or deny a D2D connection information reconfiguration request of the network. The embodiment of FIG. 3 shows a case in which the devices 1 and 2 accept the D2D connection information reconfiguration request of the network.

In step S120, the network transmits a connection reconfiguration confirm message to the devices 1 and 2. The connection reconfiguration confirm message indicates whether the D2D connection information reconfiguration finally succeeds according to the acceptance/denial of the D2D connection information reconfiguration request of the devices 1 and 2. In the embodiment of FIG. 3, since the devices 1 and 2 accept the D2D connection information reconfiguration request of the network, the connection reconfiguration confirm message indicates a success of the D2D connection information reconfiguration. The connection reconfiguration confirm message may be transmitted to each of the and the device 2 in a unicast manner, or may be transmitted in a multicast manner by using a D2D identifier assigned in the D2D connection establishment procedure.

In step S130, the network and the devices 1 and 2 apply new D2D connection information to the D2D connection.

Figure 4:
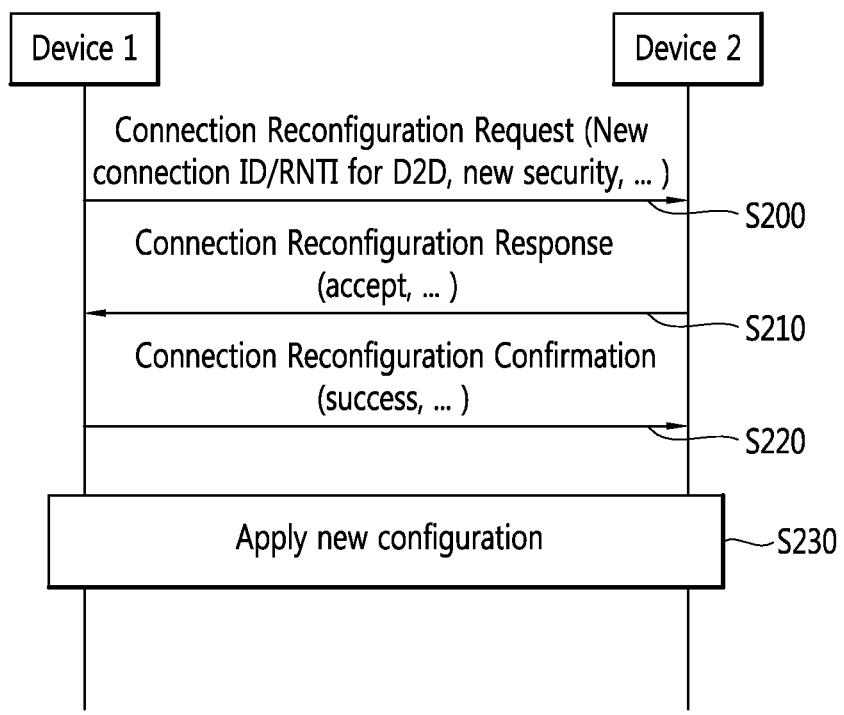
FIG. 4 shows another example of a D2D connection information reconfiguration method according to an embodiment of the present invention.

FIG. 4 shows another example of a D2D connection information reconfiguration method according to an embodiment of the present invention. In case of FIG. 4, D2D-connected devices independently perform a 3-step D2D connection information reconfiguration procedure without the intervention of a network.

In step S200, a device 1 transmits a connection reconfiguration request message to a device 2. The connection reconfiguration request message may include at least one of a new D2D identifier, new security information, and a new QoS parameter.

In step S210, the device 2 transmits a connection reconfiguration response message to the device 1 through a network. The connection reconfiguration response message indicates whether to accept or deny a D2D connection information reconfiguration request of the device 1. The embodiment of FIG. 4 shows a case in which the device 2 accepts the D2D connection information reconfiguration request of the device 1.

In step S220, the device 1 transmits a connection reconfiguration confirm message to the device 2. The connection reconfiguration confirm message indicates whether the D2D connection information reconfiguration finally succeeds according to the acceptance/denial of the D2D connection information reconfiguration request of the device 2. In the embodiment of FIG. 4, since the device 2 accepts the D2D connection information reconfiguration request of the network, the connection reconfiguration confirm message indicates a success of the D2D connection information reconfiguration.

In step S230, the devices 1 and 2 apply new D2D connection information to the D2D connection.

Figure 5:
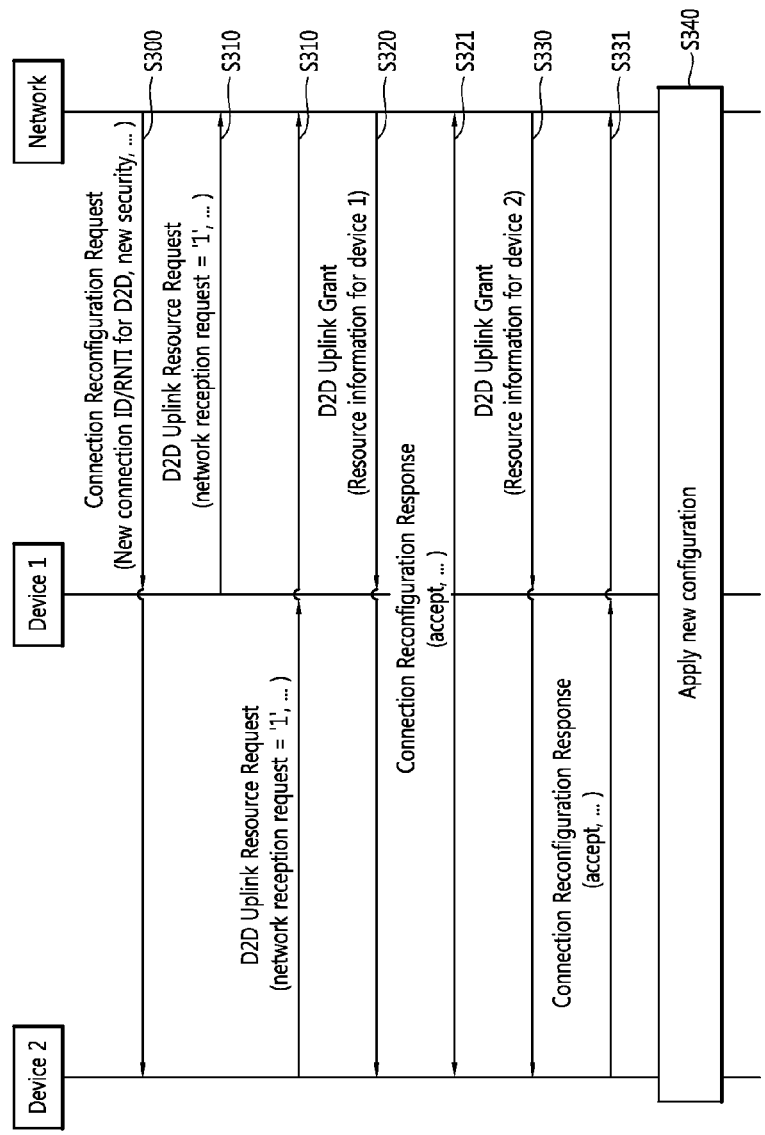
FIG. 5 shows another example of a D2D connection information reconfiguration method according to an embodiment of the present invention.

FIG. 5 shows another example of a D2D connection information reconfiguration method according to an embodiment of the present invention. In case of FIG. 5, a 2-step D2D connection information reconfiguration procedure is performed at the request of a network.

Referring to FIG. 5, in step S300, the network transmits a connection reconfiguration request message to devices 1 and 2 to which a D2D connection is established. The connection reconfiguration request message may include at least one of a new D2D identifier, new security information, and a new QoS parameter. The connection reconfiguration request message may be transmitted in a multicast manner by using a D2D identifier assigned in the D2D connection establishment procedure.

In step S310, the devices 1 and 2 transmit a D2D uplink resource request message to the network. The devices 1 and 2 may request a D2D uplink resource to the network by setting a network reception request (NRR) to '1' in the uplink resource request message.

In step S320, the network transmits a D2D uplink grant for the device 1. The D2D uplink grant includes resource information for the device 1. The D2D uplink grant for the device 1 may be transmitted in a multicast manner by using a D2D identifier assigned in the D2D connection establishment procedure. In step S321, upon receiving the D2D uplink grant for the device 1, the device 1 transmits a connection reconfiguration response message to the network. The connection reconfiguration response message indicates whether to accept or deny the D2D connection information reconfiguration request of the device 1. The embodiment of FIG. 5 shows a case in which the device 1 accepts the D2D connection information reconfiguration request of the network. The connection reconfiguration response message may also be transmitted in a multicast manner by using a D2D identifier assigned in the D2D connection establishment procedure.

In step S330, the network transmits a D2D uplink grant for the device 2. The D2D uplink grant includes resource information for the device 2. The D2D uplink grant for the device 2 may be transmitted in a multicast manner by using a D2D identifier assigned in the D2D connection establishment procedure. In step S331, upon receiving the D2D uplink grant for the device 2, the device 2 transmits a connection reconfiguration response message to the network. The connection reconfiguration response message indicates whether to accept or deny the D2D connection information reconfiguration request of the device 2. The embodiment of FIG. 5 shows a case in which the device 2 accepts the D2D connection information reconfiguration request of the network. The connection reconfiguration response message may also be transmitted in a multicast manner by using a D2D identifier assigned in the D2D connection establishment procedure.

In step S340, the network and the devices 1 and 2 apply new D2D connection information to the D2D connection.

Hereinafter, suspension and reopening of D2D multicast traffic will be described. The D2D multicast traffic may be data transmitted by a specific device located in a business (e.g., a shop, a restaurant, etc.) to a plurality of specific or random devices in a neighbor area. The specific device may report the suspension or reopening of the D2D multicast traffic transmission to a network or devices connected to the specific device. Alternatively, the network may report the suspension or reopening of the D2D multicast traffic transmission to the devices connected to the specific device. A D2D multicast traffic suspension message for reporting the suspension of the D2D multicast traffic transmission may include parameters indicating whether a D2D identifier is released, a time at which the D2D multicast traffic transmission is reopened, a monitoring period of a D2D multicast traffic reopen message, etc.

Figure 6:
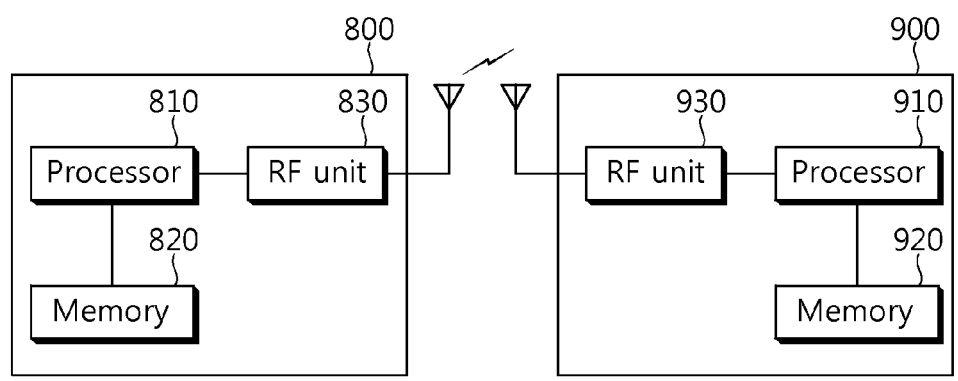
FIG. 6 is a block diagram showing wireless communication system to implement an embodiment of the present invention.

FIG. 6 is a block diagram showing wireless communication system to implement an embodiment of the present invention.

A first device 800 includes a processor 810, a memory 820, and an RF (radio frequency) unit 830. The processor 810 may be configured to implement proposed functions, procedures, and/or methods in this description. Layers of the radio interface protocol may be implemented in the processor 810. The memory 820 is operatively coupled with the processor 810 and stores a variety of information to operate the processor 810. The RF unit 830 is operatively coupled with the processor 810, and transmits and/or receives a radio signal.

A second device 900 may include a processor 910, a memory 920 and a RF unit 930. The processor 910 may be configured to implement proposed functions, procedures and/or methods described in this description. Layers of the radio interface protocol may be implemented in the processor 910. The memory 920 is operatively coupled with the processor 910 and stores a variety of information to operate the processor 910. The RF unit 930 is operatively coupled with the processor 910, and transmits and/or receives a radio signal.

The processors 810, 910 may include application-specific integrated circuit (ASIC), other chipset, logic circuit and/or data processing device. The memories 820, 920 may include read-only memory (ROM), random access memory (RAM), flash memory, memory card, storage medium and/or other storage device. The RF units 830, 930 may include baseband circuitry to process radio frequency signals. When the embodiments are implemented in software, the techniques described herein can be implemented with modules (e.g., procedures, functions, and so on) that perform the functions described herein. The modules can be stored in memories 820, 920 and executed by processors 810, 910. The memories 820, 920 can be implemented within the processors 810, 910 or external to the processors 810, 910 in which case those can be communicatively coupled to the processors 810, 910 via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What is claimed is:

1. A method for reconfiguring, by a first user equipment (UE), device-to-device (D2D) connection information in a wireless communication system, the first UE being connected to a second UE through a pre-established D2D connection, the method comprising:

receiving, from the second UE, a connection reconfiguration request message including a new quality of service (QoS) parameter, a new security information parameter, and a new D2D identifier;

transmitting, to the second UE, a connection reconfiguration response message, which indicates whether to accept a request of a D2D connection reconfiguration, in response to the connection reconfiguration request message;

receiving, from the second UE, a connection reconfiguration confirm message which indicates a success of the D2D connection reconfiguration when the first UE accepts the request of the D2D connection reconfiguration; and applying the new QoS parameter, the new security information parameter, and the new D2D identifier to the pre-established D2D connection so as not to establish a new D2D connection.

2. The method of claim 1, wherein the new D2D identifier is a link level D2D identifier allocated to a physical link between the first UE and the second UE.

3. The method of claim 1, wherein the new D2D identifier is a connection/flow level D2D identifier allocated to a logical link between the first UE and the second UE.

4. A first user equipment (UE) which is connected to a second UE through a pre-established D2D connection, the first UE comprising:

a radio frequency (RF) unit that transmits or receives a radio signal; and a processor, operatively coupled to the RF unit, and configured to:

receive, from the second UE, a connection reconfiguration request message including a new quality of service (QoS) parameter, a new security information parameter, and a new D2D identifier;

transmit, to the second UE, a connection reconfiguration response message, which indicates whether to accept a request of a D2D connection reconfiguration, in response to the connection reconfiguration request message;

receive, from the second UE, a connection reconfiguration confirm message which indicates a success of the D2D connection reconfiguration when the first UE accepts the request of the D2D connection reconfiguration; and apply the new QoS parameter, the new security information parameter, and the new D2D identifier to the pre-established D2D connection so as not to establish a new D2D connection.

5. The first UE of claim 4, wherein the new D2D identifier is a link level D2D identifier allocated to a physical link between the first UE and the second UE.

6. The first UE of claim 4, wherein the new D2D identifier is a connection/flow level D2D identifier allocated to a logical link between the first UE and the second UE.

* * * * *